Dec. 4, 1956   J. C. DYGERT   2,772,925
PROTECTING WALLS AGAINST EROSION BY SOLID PARTICLES
Filed Sept. 20, 1955   3 Sheets-Sheet 1
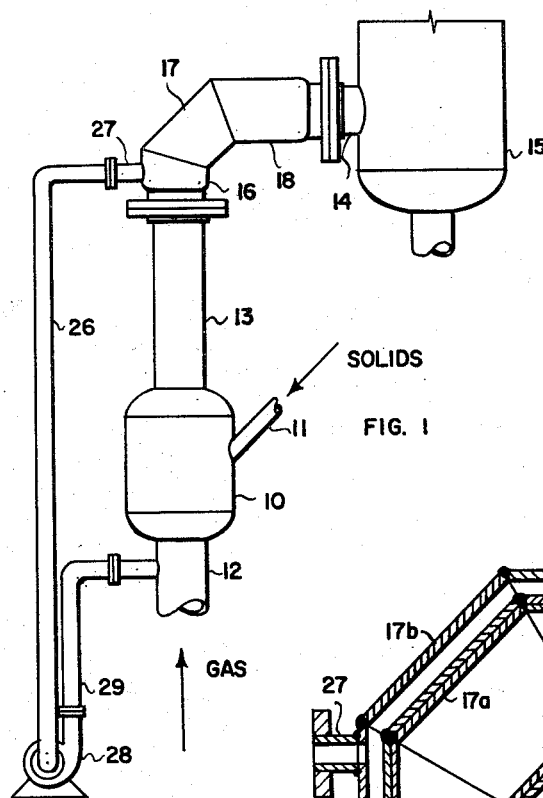
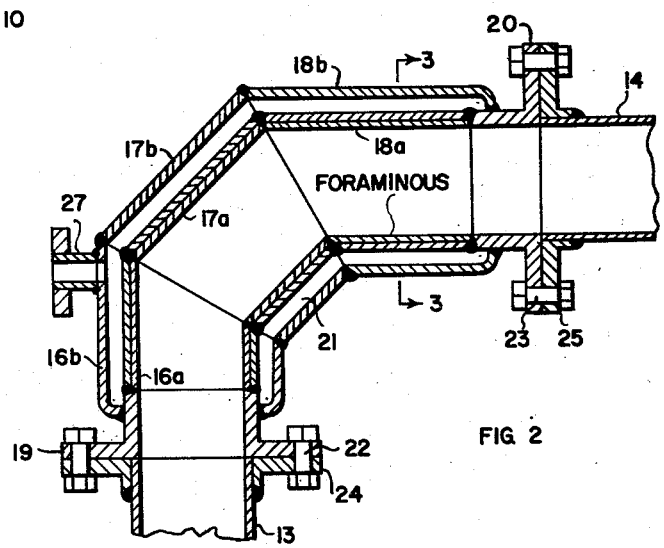
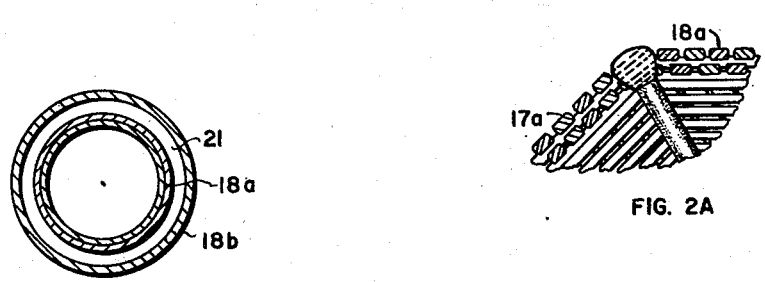
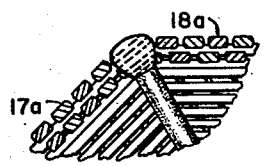
INVENTOR
JUSTIN C. DYGERT
BY *Oswald H. Milmore*
HIS ATTORNEY Dec. 4, 1956  J. C. DYGERT  2,772,925
PROTECTING WALLS AGAINST EROSION BY SOLID PARTICLES
Filed Sept. 20, 1955  3 Sheets-Sheet 2

INVENTOR
JUSTIN C. DYGERT
BY *Oswald N. Milmore*
HIS ATTORNEY

Dec. 4, 1956   J. C. DYGERT   2,772,925
PROTECTING WALLS AGAINST EROSION BY SOLID PARTICLES
Filed Sept. 20, 1955   3 Sheets-Sheet 3

INVENTOR
JUSTIN C. DYGERT
BY *Oswald H. Milmore*
HIS ATTORNEY

United States Patent Office 2,772,925
Patented Dec. 4, 1956

2,772,925

PROTECTING WALLS AGAINST EROSION BY SOLID PARTICLES

Justin C. Dygert, Walnut Creek, Calif., assignor to Shell Development Company, New York, N. Y., a corporation of Delaware Application September 20, 1955, Serial No. 535,381

5 Claims. (Cl. 302—64)

This invention relates to the protection of walls from the erosive effect of fluid-borne solids, and is, more particularly concerned with apparatus for reducing the wear which occurs on the confining and/or on the interior walls of equipment such as ducts, chambers, pumps, turbines, and the like, which handle erosive solids suspended in a gaseous or liquid medium wherein the gross flow of such medium is generally parallel to the wall.

Erosion of the surfaces of walls that bound suspensions of solids in fluids occurs in diverse types of equipment. As examples of systems or operations wherein such erosive solids are carried in suspension in contact with a wall may be mentioned the fluidization or pneumatic transport of sand or catalyst particles in combustion gas, air or hydrocarbon vapors, the separation of solids from fluids in cyclones, and the flow of water-base or oil-base mud containing gritty material, e. g., through ducts or in contact with the rotor of a pump. In all of these the gross flow of the suspending fluid is generally parallel to the wall surface (as opposed to flow generally toward the surface, as in filters). Erosion is particularly severe in those regions of such walls wherein the fluid boundary layer adjacent the wall is diminished in thickness by any means, such as by a change in the cross sectional area of the flow passage, by a bend, by a step or other irregularity in the wall surface or by acceleration. The diminution of such fluid boundary layer causes the suspending fluid to move in eddy currents or in whorled flow patterns, which in turn causes the suspended solids to move at high velocities against and along such surfaces to effect abrasion of the wall. The abrasive action is often especially severe not only at the place where the fluid boundary layer is destroyed but also somewhat downstream therefrom. In some cases wearing of the wall is caused by a suspended particle's attaining sufficiently high momentum to penetrate to the wall through the boundary layer.

It has heretofore been proposed to reduce erosion by depositing a protective layer of the suspended solids on parts of the wall surface, through the use of an adhesive, such as a resinous bonding agent (U. S. patent to Hilmer, No. 2,350,759) or by a magnetic field (U. S. patent to Garbo, No. 2,578,003). Such expedients are not, however, suitable for many applications.

It is an object of the invention to provide a simple apparatus for protecting walls against erosion from fluid-borne erosive solids which is appliable to a large variety of types of equipment, including stationary and movable walls, wherein a protective layer of the solid particles in the suspension is formed on a section of the wall to be protected.

In summary, according to the invention, a section of the wall along which a fluid suspension moves with the gross flow parallel to the wall is formed of foraminous material, and the side of the wall away from the fluid suspension is maintained at a pressure lower than that of the suspension. Initially some of the fluid passes through the small passages in the foraminous wall, depositing suspended solid particles thereon as a layer. These particles are held against the wall solely by the pressure differential acting thereon. Preferably the pressure difference between the opposed sides of the wall is sufficient to form a layer that had a thickness several times that of the mean particle diameter. After the layer has been formed only a negligible leakage of fluid occurs through the layer and the foraminous wall. It was, surprisingly, found that such a layer can be maintained on the foraminous wall with but negligible loss of fluid despite the high-velocity movement of suspended solid particles in contact with the exposed surface of the layer, occasional particles that become dislodged from the protective layer being rapidly replaced by other particles from the suspension.

The term "foraminous," as used herein, includes porous walls, e. g., those formed of sintered metal, as well as walls built up of matted, wound, intertwined or woven metallic or mineral strands, e. g., metallic mesh, metallic gauge, mineral wool or glass wool, or composite structures, e. g., walls comprising a perforated plate to which are applied a woven wire mesh and metal particles which are sintered to adhere to the mesh and plate, sold under the trademark "Rigimesh." The surface of the foraminous wall opposite the surface that bounds the fluid suspension can be maintained at a reduced pressure by applying a suction; e. g., through a jacket or other hollow low-pressure space; however, such reduced pressure may be substantially above atmospheric in cases wherein the fluid suspension is maintained under sufficient pressure. In the latter case it is not necessary to apply a suction, it being merely sufficient to provide means for discharging fluid from such low-pressure space. In the special case wherein the fluid is inexpensive and non-hazardous, e. g., air or steam, and the fluid suspension is at above atmospheric pressure, it is possible to let the fluid passing through the foraminous wall escape to the atmosphere.

The invention will be described further with reference to the accompanying drawings forming a part of this specification and showing two preferred embodiments thereof, wherein:

Figure 1 is an elevation view of a catalyst riser duct to which the invention has been applied;

Figure 2 is an enlarged sectional view of the portion of the riser, showing the bend provided with the foraminous wall section;

Figure 2A is an enlarged fragmentary view of a part of the foraminous wall of Figure 2, and showing the wall to be formed of layers of wire mats;

Figure 3 is a sectional view taken on the line 3—3 of Figure 2;

Figure 4:
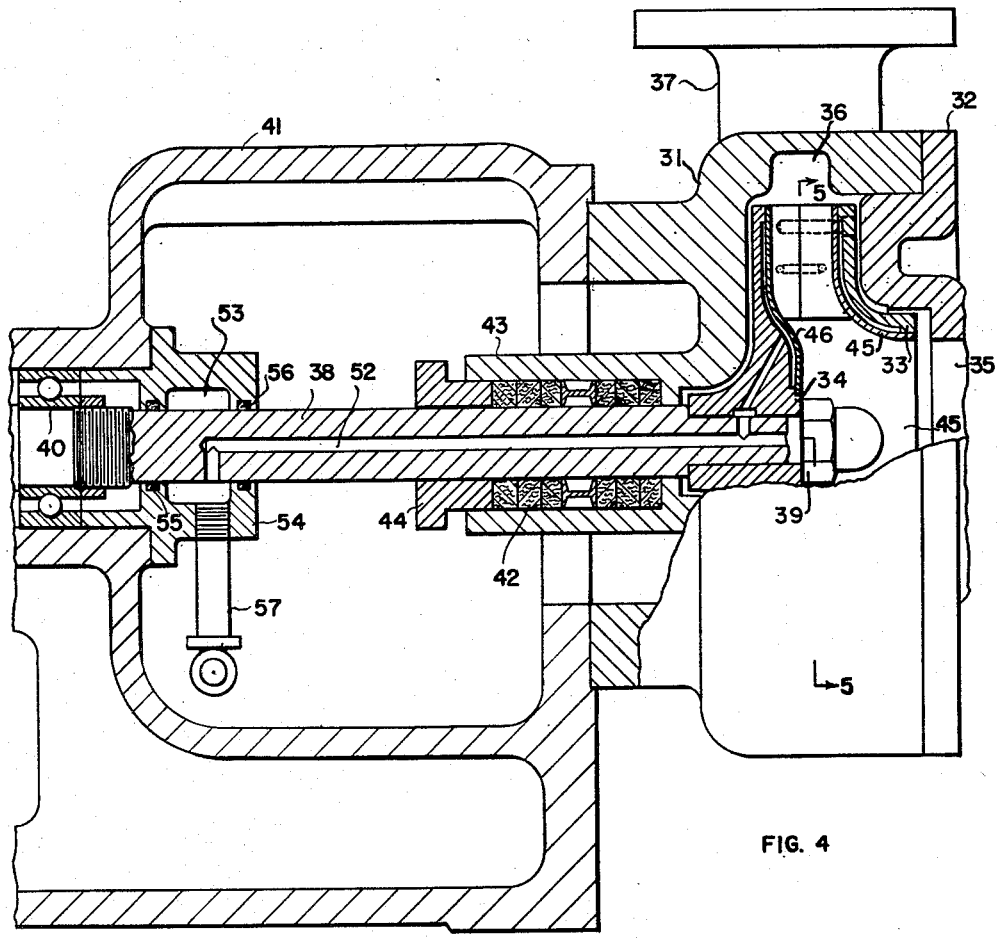
Figure 4 is an axial sectional view through a rotary fluid machine suitable for operation as a centrifugal pump or as a turbine, the rotor of which is constructed in accordance with the invention.

Referring to Figures 1–3 of the drawing, there is shown a lift pot 10 which receives solids, such as catalyst particles, by gravity flow from a standpipe 11 and entraining gas, such as air, steam or a hydrocarbon vapor, from a gas supply pipe 12 for forming a suspension of solids which ascends through a riser pipe 13. Lift pots are known in the art and the details thereof are not germane to the invention. The riser pipe makes a 90° bend leading to a horizontal section 14 which is connected to a vessel 15, which may be a fluidization chamber or other treating vessel. The invention is concerned with arrangements for preventing erosion at the bend and just beyond it.

Figures 1–3 illustrate the use of the foraminous wall sections of metallic mats formed of metal wires in layers, the wires of each layer being inclined to the wires of the adjacent layers and the layers being bonded together by sintering under pressure. To facilitate the use of such a mat the bend in the riser is conveniently constructed of a limited number, e. g., three angularly disposed bend sections 16, 17 and 18. Each section includes an inner annular foraminous wall section 16a, 17a, or 18a of the wound metal mat, joined end-to-end by welding along oblique edges, as illustrated in Figure 2A, to form a duct having an internal diameter about equal to that of the pipes 13 and 14. While Figures 2, 2A and 3 of the drawing show two layers of mats, it should be understood that this is merely representational of such walls, which may have any number of layers. The outer edges of the terminal sections 16a and 18a are welded to the cylindrical necks of welding flanges 19 and 20. Also welded to these flanges are outer, imperforate tubular wall sections 16b and 18b, respectively, joined by an intermediate outer tubular wall section 17b, which surround the foraminous wall sections with a clearance to provide an annular low-pressure or suction space 21. The outer walls and the welding flanges thus afford rigidity to the bend. The bend is connected by bolts 22 and 23 to bolting flanges 24 and 25 which are welded to the ends of the pipes 13 and 14. A suction pipe 26 is connected to the outer wall section 16b by a nozzle 27 and connects the low-pressure space 21 to any suitable suction source, such as the intake of a suction pump 28 which discharges via a pipe 29 to the gas supply pipe 12.

In operation, the pump 28 establishes within the annular low-pressure space 21 a pressure which is lower than that prevailing inside the flow passage enclosed by the foraminous wall sections 16a, 17a and 18a, wherein the suspension of solids travels generally parallel to the axis of the passage, i. e., parallel to the walls. Initially the pressure difference causes some of the gas to pass through the fine passages in these foraminous walls, thereby depositing a protective layer of the solids by a filtering action. When the layer is built up it obstructs completely, or to a large extent, the further passage of gas through the wall. The protective layer is maintained in position by the pressure differential between the outer and inner surfaces thereof, and thereby protects the foraminous wall against erosion by the suspended solids moving through the bend. When portions of this protective layer are dislodged by erosive action they are forthwith replaced by other solid particles from the suspension.

Referring to Figures 4–8, there is shown a rotary fluid machine suitable as a centrifugal pump or as a turbine, including a casing formed of sections 31 and 32, and a rotor having abutting end sections 33 and 34. The casing section 32 is shaped to provide an axial passage 35 (which serves as an inlet for supplying fluid to the center of the rotor when the machine is used as a pump and as an outlet when used as a turbine) and the section 31 has a scroll passage 36 leading to or from a passage within a flanged pipe 37 integral with the bore. The rotor section 34 is fixed to a drive shaft 38 by a nut 39. The shaft, which is driven from the left, is journalled by a bearing 40 mounted in an auxiliary frame 41 which is fastened to the casing. A running seal is provided by packing 42 retained within a tubular extension 43 of the pump casing section 31 by a gland 44.

The novel feature relates to an arrangement for protecting the surfaces of the rotor against erosion by solids, such as gritty materials, present in the fluid handled thereby. For this purpose the rotor includes a pair of abutting inner sections 45 and 46, formed of foraminous material, such as sintered metal having small passages or pores through which liquid can pass. The porous sections are mounted between the impervious sections 31 and 32 as described in detail in the following paragraph to provide four inter-communicating suction or low-pressure spaces as follows: a space 47 between the radially extending portions of sections 33 and 45; a space 48 between the radially extending portions of the sections 34 and 46; and spaces 49 and 50 within the impeller blades formed by other portions of the porous sections. The space 48 communicates by an inclined bore 51 with a bore 52 in the drive shaft which, in turn, opens into an annular suction chamber 53 defined by a suction box 54 carried by the frame 41. The shaft, which extends through this box, has running seals 55 and 56. The chamber 52 is connected by a suction pipe 57 to a suitable source of suction, not shown, such as a separate suction pump or, when the pump or turbine constitutes one of several stages, to a stage operating at a lower pressure.

Figure 5:
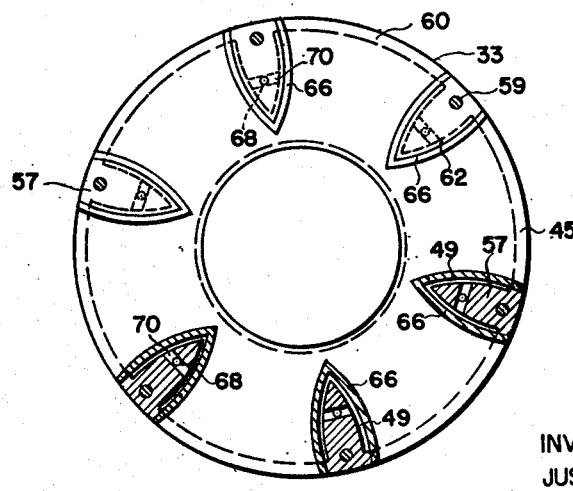
Figure 5 is a transverse sectional view of the rotor, taken on the broken line 5—5 of Figure 4.
Figure 6:
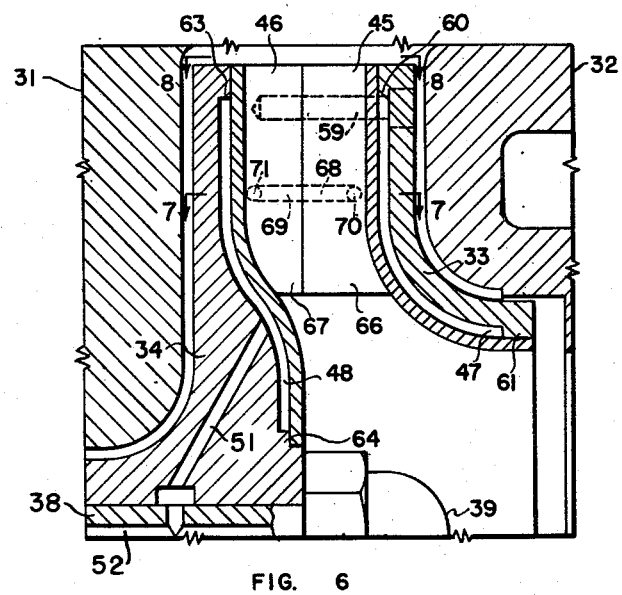
Figure 6 is an enlarged view of a portion of Figure 4.
Figure 7:
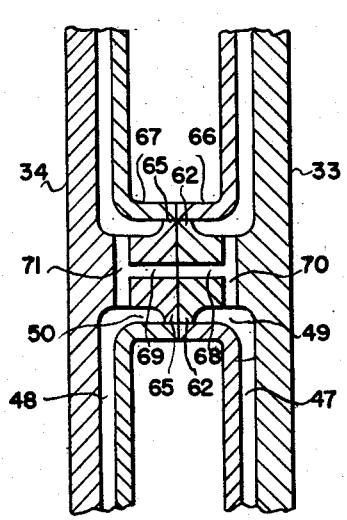
Figure 7 is a fragmentary sectional view taken on the line 7—7 of Figure 6, on an enlarged scale.
Figure 8:
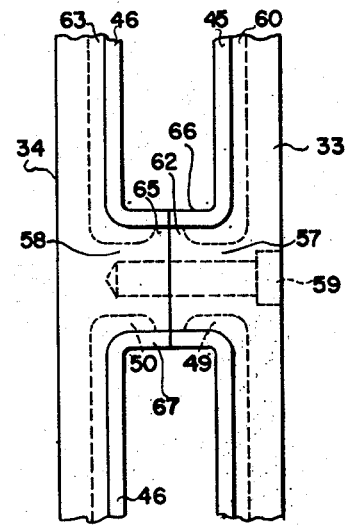
Figure 8 is a developed view of the periphery of the rotor, viewed as indicated by the line 8—8 of Figure 6.

Considering the rotor in greater detail, the right outer rotor section 33 has a plurality, e. g., six, circumferentially spaced integral projections 57 extending parallel to the rotor axis from the left face of the section 33 to a common transverse plane and extending radially inwards from the periphery and tapering toward the axis as pointed arches. They are aligned with corresponding projections 58 integral on the right face of the left outer rotor section 34. Each projection 57 is in abutment with a corresponding projection 58 (Figures 7 and 8) in sealing relation, and each pair of projections forms the core of one impeller blade. The two outer rotor sections are clamped together by bolts 59 which pass through aligned holes in these projections and are threadedly secured to the section 34. The right outer rotor section 33 further has a peripheral flange 60 extending outwardly beyond the left face thereof between each pair of projections 57 and continuing along the flanks of these projections at the radially outer edges thereof; the section 33 also has an annular shoulder 61 near the axis. A narrow flange or raised portion 62 extends continuously about the flank of each projection 57 adjacent the left extremity thereof, the radially outer ends of the flange 62 being joined to the flange 60. Similarly, the left outer rotor section 34 has a peripheral flange 63 extending out from the right face thereof between each pair of projections 58 and along the flanks of these projections at the radially outer edges thereof, and an annular shoulder 64 near the axis. A narrow flange or raised portion 65 extends continuously about the flank of each projection 58 at the right extremity thereof and has the outer ends thereof joined to the flange 63. The right inner rotor section 45 includes a porous wall that is continuous, both circumferentially and radially, from the shoulder 61 to the flange 60, save for recesses to accommodate the projections 57, as shown in Figures 4, 5 and 6, this wall being positioned by the said shoulder and flange in spaced relation to the outer section to provide the space 47. Integral to the section 45 are impeller walls 66, also of porous material, that enclose the projections 57. The margins of the walls 66 engage the contiguous parts of the flanges 60 along the lengths of the projections and the flanges 62, whereby the remaining parts of the walls 66 are spaced from the projections 57 to form the suction spaces 49. It is evident that the spaces 47 and 49 are in direct communication. Similarly, the left inner rotor section 46 has a wall extending from the shoulder 64 to the flange 63 in spaced relation to the left outer rotor section to provide the space 48, and has integral impeller walls 67 of porous material that enclose the projections 58 in spaced relation, save for contact along their right and radially outer edges with the flanges 65 and 63, respectively, to provide the suction spaces 50 between the projections 58 and the walls 67, which spaces are in direct communication with the space 48. The walls 67 are in abutment with the walls 66. Intercommunication between the spaces 47 and 49 on the one hand and the spaces 48 and 50 on the other is afforded by a plurality of bores formed in the projections 57 and 58 as follows:

Each projection 57 has a short bore 68 parallel to the rotor axis in registry with a similar bore 69 in the abutting projection 58. At the inner end of each of these bores is a communicating transverse bore 70 or 71, leading to the space 49 or 50, respectively.

It is evident that the fluid passage within the rotor and between the blades thereof is bounded by the porous walls of the sections 45 and 46, including the porous impeller walls 66 and 67, and that all of these porous walls adjoin low-pressure spaces 47—50 to which suction can be applied through the suction pipe 57. When operated as a pump, the rotor causes fluid from the inlet passage 35 to flow radially outward through the rotor to the scroll passage 36, the gross flow of the fluid in the rotor being parallel to the said porous walls. Suction in the low-pressure spaces causes fluid flow through the porous walls whereby some of the material suspended in the fluid is deposited on the porous walls as a protective layer; this layer is retained thereon by the resultant differential pressure. The thickness of the layer is self-limiting because as the layer builds up it obstructs the flow of fluid into the low-pressure spaces, whereupon further growth of the protective layer ceases. When operated as a turbine the flow is inward from the scroll passage 36 through the rotor to the passage 36, which now is an outlet. Suction applied to the low-pressure spaces causes the same deposition of a protective layer.

It should be understood that the riser bend and the centrifugal pump or turbine are merely illustrative of two diverse applications of the invention.

I claim as my invention:

1. In apparatus wherein a suspension of erosive solid particles in a fluid move with the gross flow of said fluid generally parallel to the bounding surface of a wall, the improvement of a structure for resisting erosion of said wall including a foraminous section in said wall and means for maintaining the other surface of the wall at a pressure lower than that of the fluid suspension to form and maintain on said bounding surface a protective layer of said solid particles.

2. Apparatus according to claim 1 wherein said wall is the confining wall of a vessel and said means for maintaining a lower pressure includes a jacket enclosing a low-pressure space adjoining said other surface of the wall, and means for removing fluid from said space.

3. Apparatus according to claim 1 wherein said vessel is a duct having a bend and connected to means for supplying a suspension of solids in a gas for flow through said duct, said foraminous wall section being situated at the bend.

4. Apparatus according to claim 1 wherein said wall is a part of a body mounted for movement within a housing that contains said suspension, said body being hollow and having means for evacuating the interior thereof.

5. Apparatus according to claim 4 wherein said housing is the casing of a rotary fluid machine and said body is the rotor of said machine.

References Cited in the file of this patent

UNITED STATES PATENTS

| 2,350,759 | Hilmer | June 6, 1944 |
| 2,578,003 | Garbo | Dec. 11, 1951 |

FOREIGN PATENTS

| 578,373 | Germany | Oct. 29, 1931 |